United States Patent
Immendorf et al.

(10) Patent No.: US 9,572,055 B2
(45) Date of Patent: Feb. 14, 2017

(54) UPLINK INTERFERENCE DETECTION USING TRANSMISSION MATRICES

(71) Applicant: Eden Rock Communications, LLC, Bothell, WA (US)

(72) Inventors: Chaz Immendorf, Bothell, WA (US); Rekha Menon, Bothell, WA (US); Eamonn Gormley, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 68 days.

(21) Appl. No.: 14/022,654

(22) Filed: Sep. 10, 2013

(65) Prior Publication Data

US 2014/0301216 A1    Oct. 9, 2014

Related U.S. Application Data

(60) Provisional application No. 61/810,171, filed on Apr. 9, 2013.

(51) Int. Cl.
| | | |
|---|---|---|
| H04W 24/08 | (2009.01) | |
| H04W 24/02 | (2009.01) | |
| H04W 48/12 | (2009.01) | |
| H04W 72/12 | (2009.01) | |

(52) U.S. Cl.
CPC ............. *H04W 24/08* (2013.01); *H04W 24/02* (2013.01); *H04W 72/1268* (2013.01); *H04W 48/12* (2013.01); *H04W 72/1231* (2013.01)

(58) Field of Classification Search
None
See application file for complete search history.

(56) References Cited

U.S. PATENT DOCUMENTS

| | | | |
|---|---|---|---|
| 7,424,299 B1* | 9/2008 | Jolma | H04W 72/082 370/331 |
| 2006/0077912 A1* | 4/2006 | Cheng | 370/265 |
| 2006/0209755 A1* | 9/2006 | Khan et al. | 370/329 |
| 2009/0047958 A1* | 2/2009 | Rimhagen et al. | 455/436 |
| 2009/0073929 A1* | 3/2009 | Malladi et al. | 370/329 |
| 2009/0191862 A1* | 7/2009 | Amirijoo et al. | 455/424 |
| 2010/0303052 A1* | 12/2010 | Visuri et al. | 370/342 |
| 2011/0045835 A1* | 2/2011 | Chou et al. | 455/446 |

(Continued)

FOREIGN PATENT DOCUMENTS

| | | |
|---|---|---|
| WO | WO 2005/032190 A1 | 4/2005 |
| WO | WO 2012/068413 A1 | 5/2012 |

(Continued)

OTHER PUBLICATIONS

International Search Report and Written Opinion for PCT/US2013/067626, filed on Oct. 30, 2013.

*Primary Examiner* — Ayaz Sheikh
*Assistant Examiner* — Peter Chau

(57) ABSTRACT

Identifying interference in a cellular network may include creating an interference neighbor list for a target base station that includes a plurality of neighboring base stations, determining a plurality of quiet resource blocks common to the plurality of neighboring base stations and the target base station, and analyzing signals received at the target base station during the plurality of quiet resource blocks. Whether to modify uplink transmission schedules, and the extent of modification, may be determined based on traffic levels.

26 Claims, 10 Drawing Sheets

(56) References Cited

U.S. PATENT DOCUMENTS

| | | | |
|---|---|---|---|
| 2011/0077015 A1* | 3/2011 | Saily et al. | 455/450 |
| 2011/0235598 A1 | 9/2011 | Hilborn | |
| 2011/0292890 A1* | 12/2011 | Kulkarni et al. | 370/329 |
| 2012/0002598 A1 | 1/2012 | Seo et al. | |
| 2012/0028664 A1* | 2/2012 | Zhang et al. | 455/501 |
| 2012/0088535 A1* | 4/2012 | Wang et al. | 455/513 |
| 2012/0122504 A1* | 5/2012 | Sang et al. | 455/501 |
| 2012/0263142 A1* | 10/2012 | Ahn et al. | 370/330 |

FOREIGN PATENT DOCUMENTS

| | | |
|---|---|---|
| WO | WO 2012/089269 A1 | 7/2012 |
| WO | WO 2012/148414 A1 | 11/2012 |

\* cited by examiner

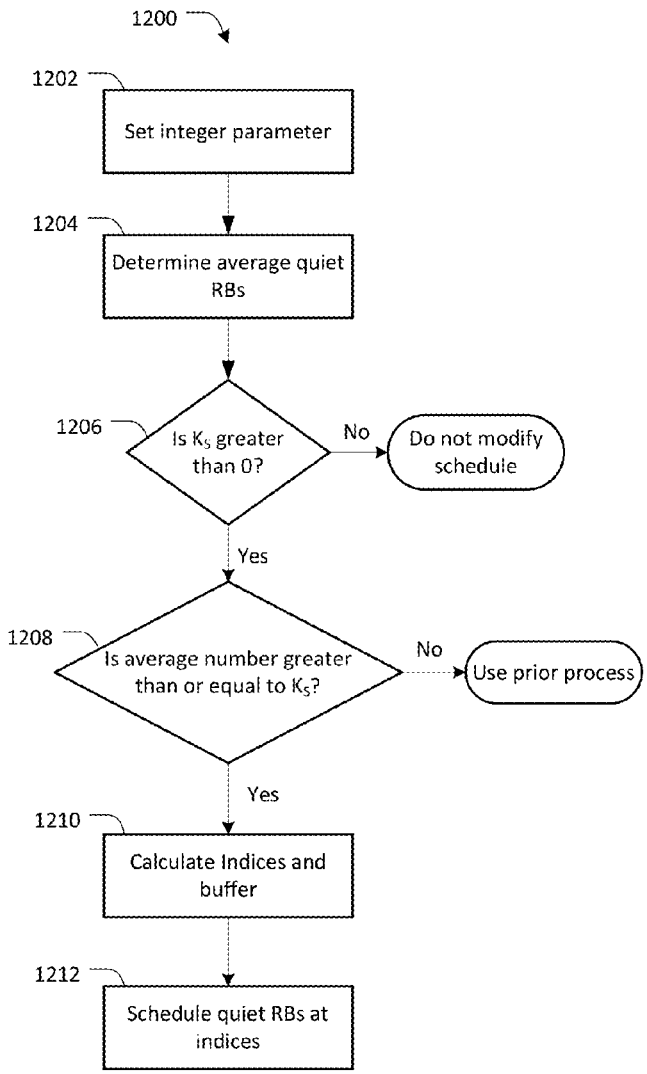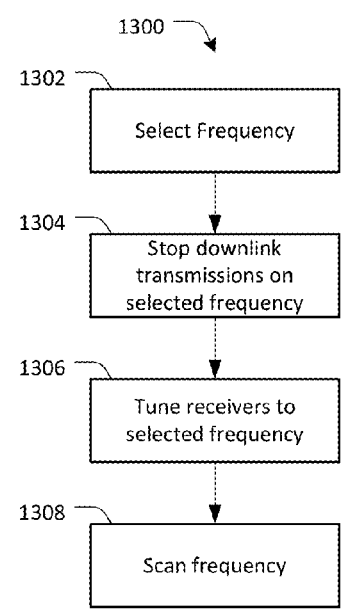
Fig. 12
Fig. 13

UPLINK INTERFERENCE DETECTION USING TRANSMISSION MATRICES

CROSS-REFERENCES TO RELATED APPLICATIONS

The present invention claims priority to U.S. Provisional Application No. 61/810,171, filed Apr. 9, 2013, which is incorporated by reference herein for all purposes.

BACKGROUND OF THE INVENTION

Wireless network operators pay large amounts of money to license wireless spectrum for their networks. They therefore carefully locate base stations and configure radio parameters to maximize the usage efficiency of the available spectrum. However, on many occasions, unlicensed users operate devices that cause interference to the licensed wireless equipment. The interference can degrade the performance of the licensed equipment, resulting in poor quality voice calls, dropped calls, a reduction in throughput in data networks, etc.

It may not be readily apparent that the deterioration in service is caused by external interference. Identifying a source of external interference may require prolonged trouble-shooting by the network operators. Hence, a dynamic way of identifying external interference is desirable. The ability to locate the interference source can further help to neutralize or shut down the interference source. When the cellular network is not the primary user of a spectrum allocation, a method to detect interference from the primary users is desirable.

BRIEF SUMMARY OF THE INVENTION

Embodiments of the present invention provide a method and system to dynamically detect and locate external interference at the base stations of a wireless network. Embodiments may include a coordination mechanism with low overhead that improves the performance and flexibility of the detection scheme, and prioritization of interference detection relative to data transmission.

Once the interference is detected, the cellular network can elect to not use portions of the spectrum on which other radiating sources have been detected. For example, in an LTE system, if narrowband interference is detected at LTE eNodeBs (base stations) then the data scheduler at the eNodeBs can ensure that the frequencies used by the narrowband interference source are not used.

In an embodiment, identifying interference in a cellular network method includes creating an interference neighbor list for a target base station that includes a plurality of neighboring base stations, determining a plurality of quiet resource blocks common to the plurality of neighboring base stations and the target base station, and analyzing signals received at the target base station during the plurality of quiet resource blocks. Identifying interference may further include transmitting schedule information from each of the base stations on the interference neighbor list to a computing device coupled to a backhaul portion of the cellular network, where the computing device determines the plurality of quiet resource blocks common to the plurality of neighboring base stations and the target base station.

In an embodiment, determining a plurality of quiet resource blocks includes comparing schedule information of the base stations on the interference neighbor list to schedule information for the target base station to identify the plurality of quiet resource blocks common to the plurality of neighboring base stations and the target base station.

Determining the plurality of quiet resource blocks may include designating a plurality of resource block indices in uplink transmission schedules of the plurality of neighboring base stations and the target base station, and allocating one or more quiet resource blocks to the plurality of resource block indices.

In an embodiment, the plurality of resource block indices are designated according to the following equation:

$$k(t) = (K_N + tK_T) \bmod N,$$

in which N is a total number of resource blocks in the interference detection period, k(t) is an index, KN and KT are integers in the set $\{0, \ldots, N-1\}$, and t is an integer in the set $\{0, \ldots, T\}$. Indices may be defined by an offset and a rate within a plurality of the interference detection periods.

Determining the plurality of quiet resource blocks may further include calculating an average number of quiet resource blocks present in at least one base station among the plurality of base stations, comparing the average number of quiet resource blocks to a value, and when the average number of quiet resource blocks is less than the value, allocating additional quiet resource blocks to an uplink transmission schedule. The additional quiet resource blocks may be allocated adjacent to indexed quiet resource blocks in the modified uplink transmission schedule.

In an embodiment, analyzing the received signals includes determining at least one of a location and a periodicity of the interference.

In some embodiments, creating the interference neighbor list includes receiving wireless signals from a plurality of user equipment attached to neighboring base stations at the target base station, comparing each of the received wireless signals to a threshold value, and when a particular signal exceeds the threshold value, adding a base station serving the user equipment which sent the particular signal to the interference neighbor list.

In another embodiment, creating the interference neighbor list includes receiving a wireless signal from the target base station at a UE served by a candidate base station, comparing the received wireless signal to a threshold value, and when the received wireless signal exceeds the threshold value, adding the base station serving the UE to the interference neighbor list of the target base station.

Embodiments may use a dynamic neighbor list. For example, a first base station may be removed from the neighbor list when a signal associated with the first base station is not received with a power level exceeding a threshold value within a predetermined time.

An embodiment may include designating a set of downlink frequencies, tuning a receiver of the target base station to the set of downlink frequencies, and receiving signals over the set of downlink frequencies by the receiver of the target base station, where analyzing the received signals includes analyzing the signals received over the set of downlink frequencies.

An embodiment using a time division duplexing (TDD) transmission scheme may include reallocating a portion of time designated for downlink transmissions to a portion of time designated for uplink transmissions.

BRIEF DESCRIPTION OF THE DRAWINGS

FIG. 12 illustrates a process for detecting interference according to an embodiment.

FIG. 13 illustrates a process for interference detection using downlink frequencies.

DETAILED DESCRIPTION OF THE INVENTION

Figure 1:
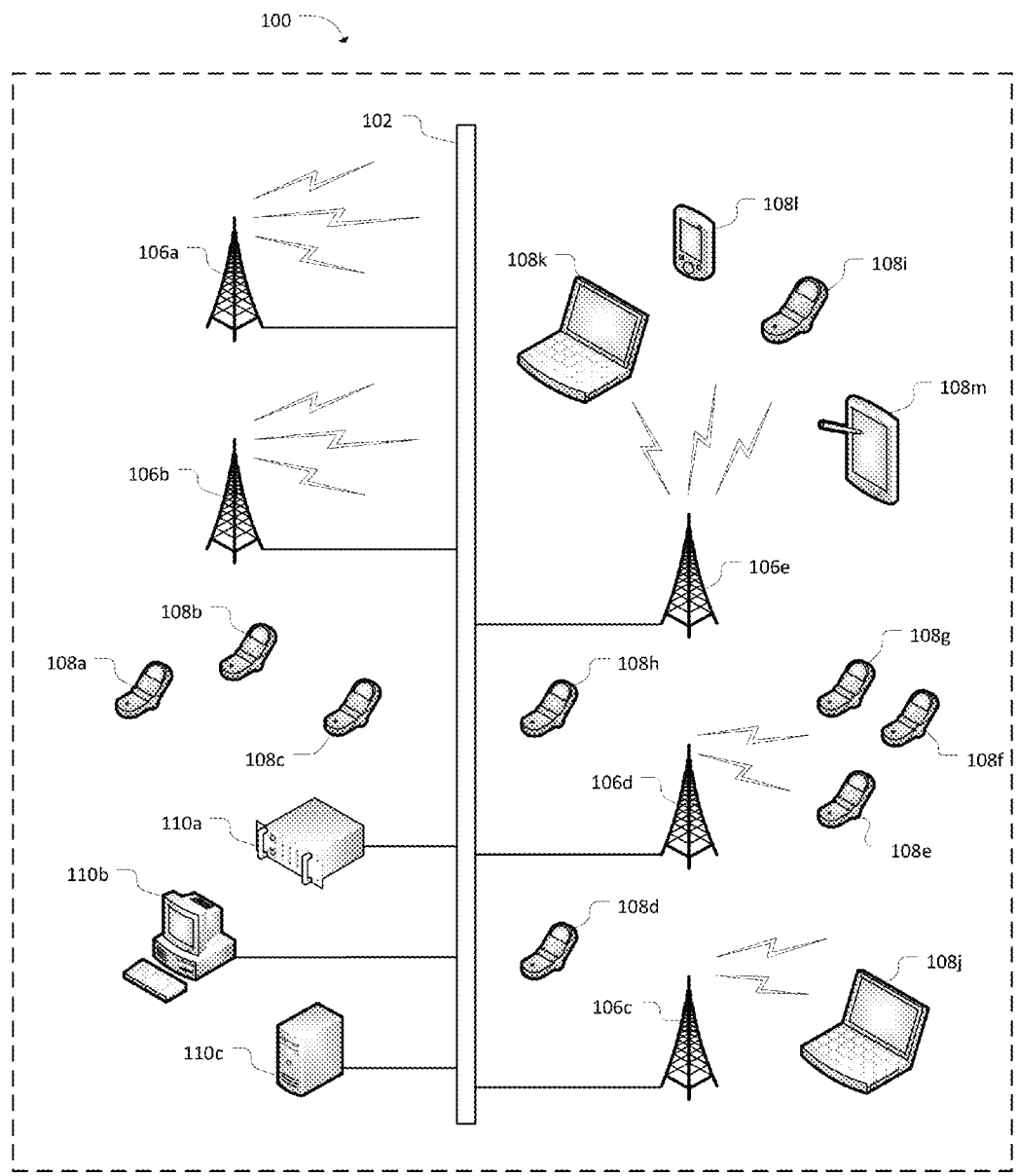
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates an example networked computing system 100 according to an embodiment of this disclosure. As depicted, system 100 includes a data communications network 102, one or more base stations 106a-e, one or more base station antennas 104a-e, one or more network resource controller 110a-c, and one or more User Equipment (UE) 108a-m. As used herein, the term "base station" refers to a wireless communications station provided in a location and serves as a hub of a wireless network. The base stations include macrocells, microcells, picocells, and femtocells.

In a system 100 according to an embodiment of the present invention, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure. Further, processes for detecting interference may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
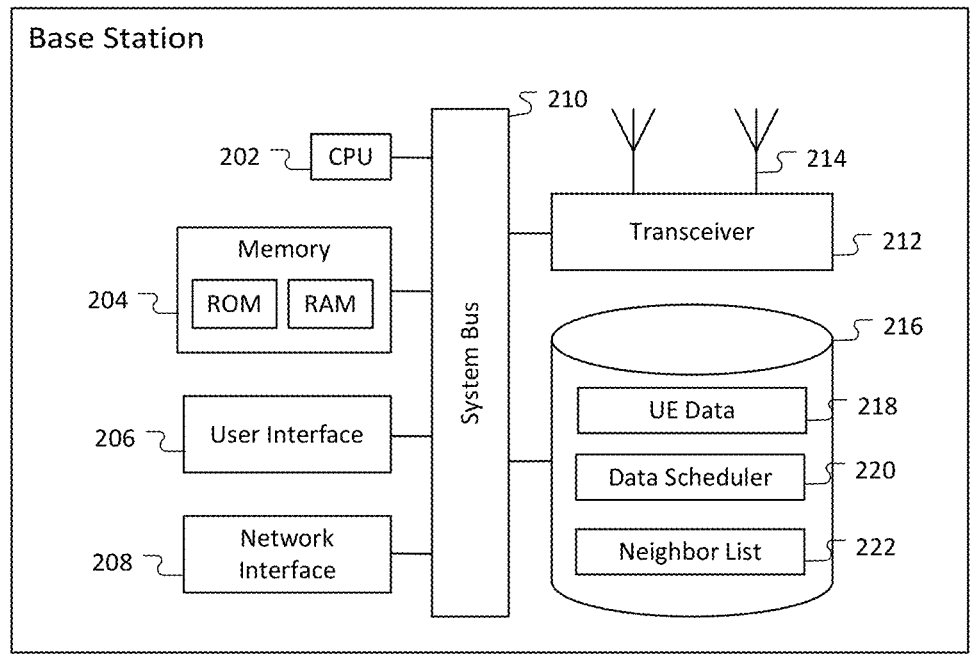
FIG. 2 illustrates a network resource controller according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive scheduling information to and from an NRC, transmit signal data to an NRC, and share UE data with other base stations through network interface 208. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data device 216 and CPU 202 which executes the program. In an embodiment, data storage 216 may store UE data 218, a data scheduler 220, and a neighbor list 222. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
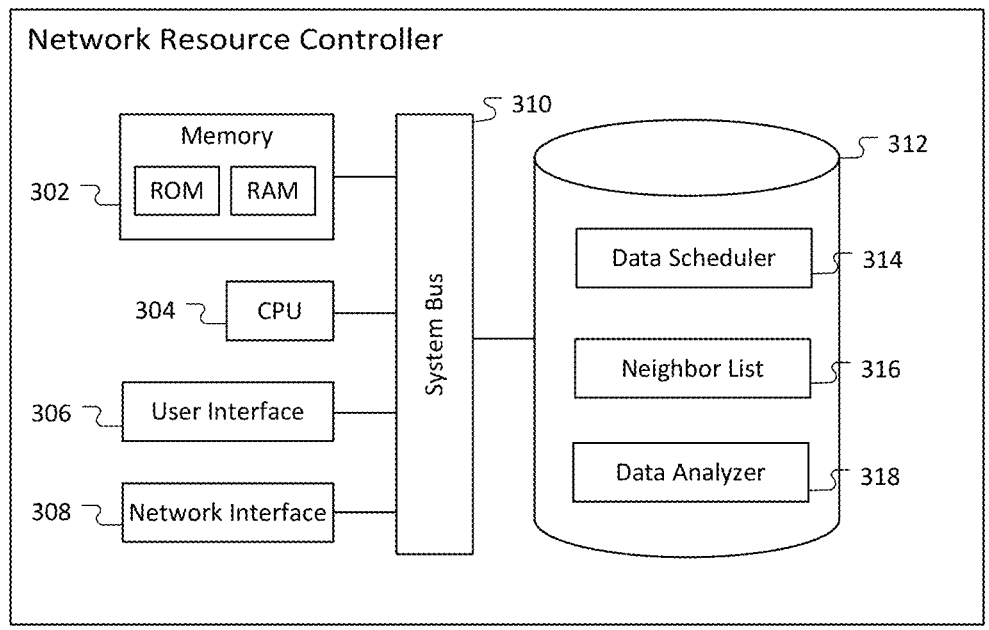
FIG. 3 illustrates a base station according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may include a data scheduler 314, neighbor list information 316, and data analyzer 318.

In an embodiment, data scheduler 314 controls the uplink and downlink transmissions in the cellular network. Various embodiments may have a data scheduler 314 in an NRC 300 as an alternative or in addition to the data scheduler 220 that may be included in base station 200. A radio resource manager (RRM), which may be embodied as an NRC 300, informs each of the data schedulers 220 and/or 314 in the network of the frequency and time resources on which they can transmit and receive data. The RRM is usually located at a centralized location in the network, where it can communicate to all the data schedulers in the network. Data analyzer 318 may include program information for executing one or more form of data analysis described below, such as triangulation to identify a location of a source of interference.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110*a-c*, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
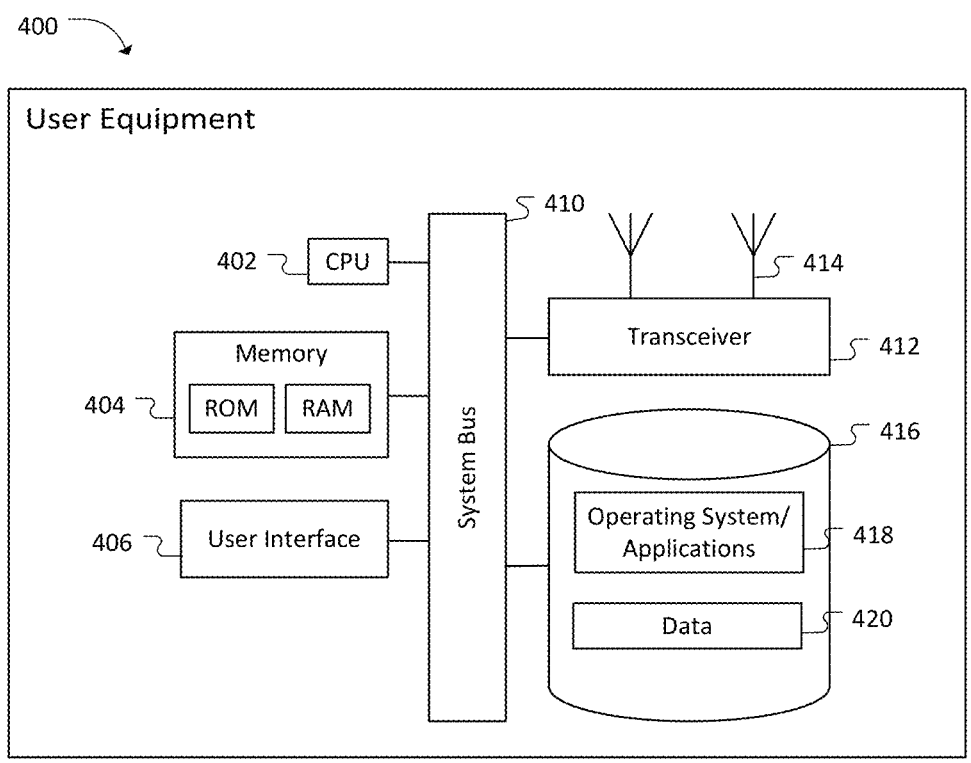
FIG. 4 illustrates user equipment according to an embodiment.

FIG. 4 illustrates a block diagram of user equipment 400 that may be representative of any of UEs 108 shown in FIG. 1. User equipment 400 may include a CPU 402, a memory 404, a user interface 406, a transceiver 412 including antenna 414, and storage device 416. Each of the components may communicate with one another through system bus 410. Storage device 416 may include operating system and applications 418 as well as data 420, which is data that is transmitted wirelessly through transceiver 412.

Figure 5:
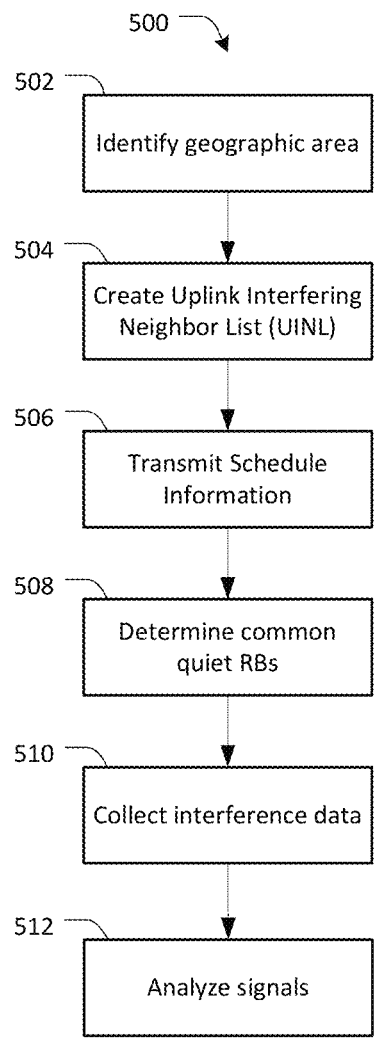
FIG. 5 illustrates an uplink transmission matrix according to an embodiment.

FIG. 5 illustrates a process 500 for detecting interference according to an embodiment of the present invention. Specific examples and embodiments of aspects of process 500 are explained in more detail with respect to processes 900, 1000, and 1200 below. In other words, process 500 is compatible with the other processes described herein, and each of the processes can be described as an element of process 500.

A process 500 may begin with a step 502 of identifying a geographic area. The geographic area is the area in which interference detection is desired. In some embodiments, an operator may see increased levels of interference in a particular area, so the operator may restrict interference detection to base stations within the particular area. In other embodiments, the geographic area may be an entire network, so step 502 may be omitted.

In step 504, an uplink interfering neighbor list (UINL) is created for a target base station. The target base station is a base station at which interfering signals are measured. Multiple base stations may be designated as target base stations, and interference detection may be performed separately for each target base station.

In step 506, schedule information is transmitted from the base stations on the UINL to an NRC. The schedule information may include all or a portion of an uplink transmission schedule. In an embodiment, the schedule information includes an allocation of RBs in a given time period. The NRC then analyzes the schedule information in step 508 to determine common uplink quiet times, or common quiet resource blocks, that exist in the schedule. An uplink quiet time, or quiet resource block (RB), refers to an RB for which no uplink transmissions are scheduled for a given base station. A common uplink quiet time, or quiet resource block (RB) for a target base station, refers to an RB in which no uplink transmissions are scheduled at any base station in the target base station's UINL. As will be explained in further detail below, determining quiet RBs 508 may further include providing schedule parameters to base stations in order to allocate or create quiet RBs.

RF signals are received by the target base station during quiet times in step 510. The signals received by one or more target base station are then analyzed in step 512 to determine interference information, which may include the frequency, level, periodicity, and location of a source of interference. In an embodiment, interference strength data from a plurality of target base stations can be used to locate an interference source by employing a technique such as triangulation or trilateration.

The concept of a transmission matrix according to embodiments of the present invention will now be explained with respect to FIGS. 6A and 6B. A base station can receive N uplink RBs over a predetermined period, which is typically a number of milliseconds. An RB, as referred to herein, represents a unit of time and frequency resources.

For example, in an LTE system, an RB spans 0.5 ms in the time domain and 180 KHz in the frequency domain. Hence, a base station that can receive uplink transmissions over a bandwidth of 540 KHz receives 6 RBs every millisecond. In the example show in FIG. 6A, the 6 RBs may be expressed in a single row where N=6. Thus, although the Y-axis of the matrix is expressed in progressive time units, RBs that occur sequentially may be assigned to the same row depending on the value of N. The transmission period is referred to here as the interference detection time period, and is configurable for the network.

Figure 6A:
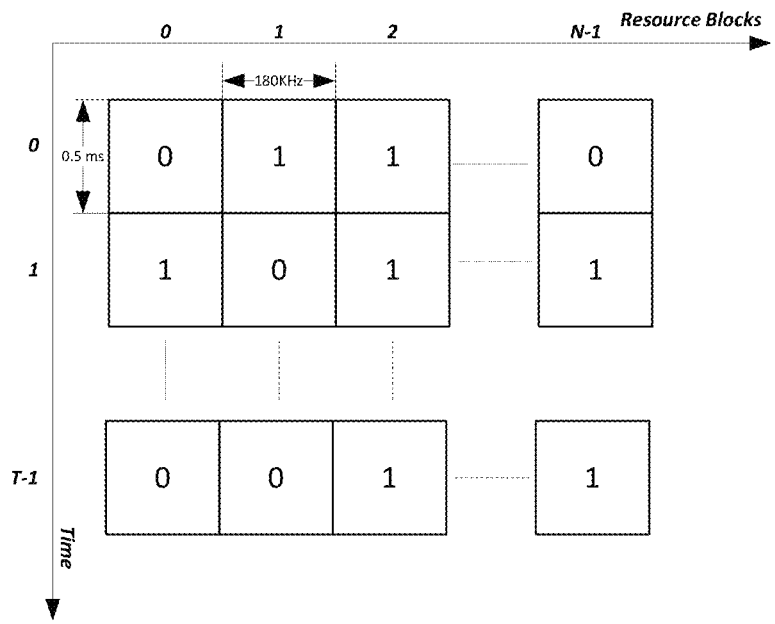
FIGS. 6A and 6B illustrates detecting interference using quiet resource blocks according to an embodiment.
Figure 6B:
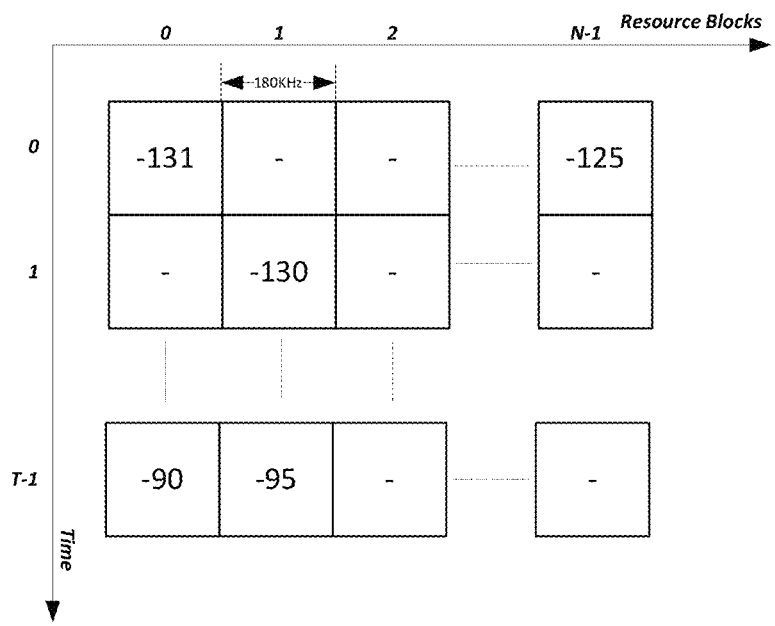

As seen in FIGS. 6A and 6B, the uplink transmission to a base station over the interference detection period can be represented by a binary matrix with N columns and T rows. Each element of the matrix uniquely indexes an RB available for uplink transmission. In FIG. 6A, a matrix element with a value of one indicates that a transmission was scheduled on the indexed RB, and a value of zero indicates that no transmission was scheduled.

Figure 7A:
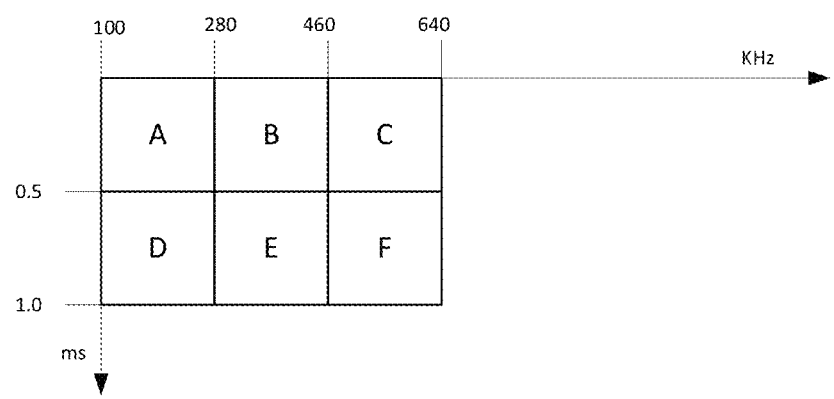
FIGS. 7A and 7B illustrate resource allocation according to an embodiment.
Figure 7B:
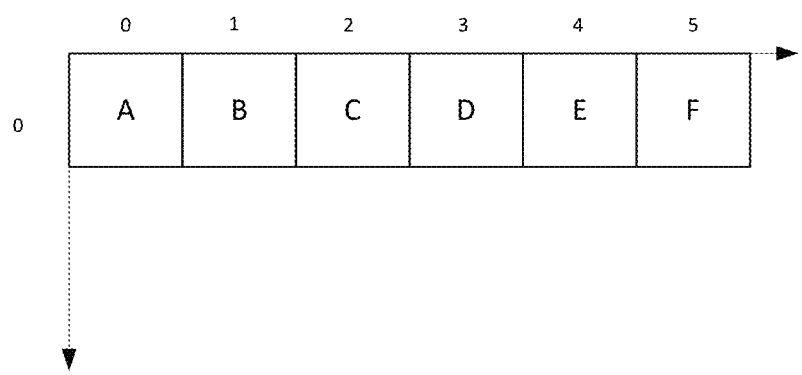

FIGS. 7A and 7B illustrate the relationship between RBs and a transmission matrix. FIG. 7A shows a transmission schedule in time and frequency dimensions. In the example of FIG. 7A, each RB is 180 KHz by 0.5 ms. During the first 0.5 ms of transmission, RBs A, B, and C are transmitted in frequency blocks 100-280 KHz, 280-460 KHz, and 460-640 KHz, respectively. Next, during the second 0.5 ms of transmission, RBs D, E, and F are transmitted in the same frequency blocks.

FIG. 7B shows the same transmissions in a transmission matrix in which N=6. Accordingly, even though actual transmissions of blocks D, E, and F occur after the transmission of blocks A, B, and C, both sets of transmission blocks are arranged in the same row 0. While the time dimension of all RBs is the same in this example (0.5 ms), the actual transmissions occur during two separate time periods.

In an embodiment in which data schedulers are distributed throughout a network at base stations, the scheduler at each base station may create an uplink transmission matrix to keep track of its transmission schedule over the interference detection time period. The populated transmission matrix is then periodically sent to a centralized NRC. In an embodiment in which the data scheduler is centralized on a computer other than the NRC that analyzes the schedules, the uplink transmission matrices are transmitted to the analysis NRC.

FIG. 6B shows hypothetical received signal strength indication (RSSI) dBm values measured in unallocated RBs from the uplink transmission matrix example shown in FIG. 6A. The relationship between the transmission and quiet times of FIG. 6A and the RSSI values of FIG. 6B illustrates the correspondence between quiet times and interference measurement. Although the example in FIG. 6B only shows a single measurement value, it should be noted that in other embodiments multiple values may be measured within a single resource block.

Figure 8:
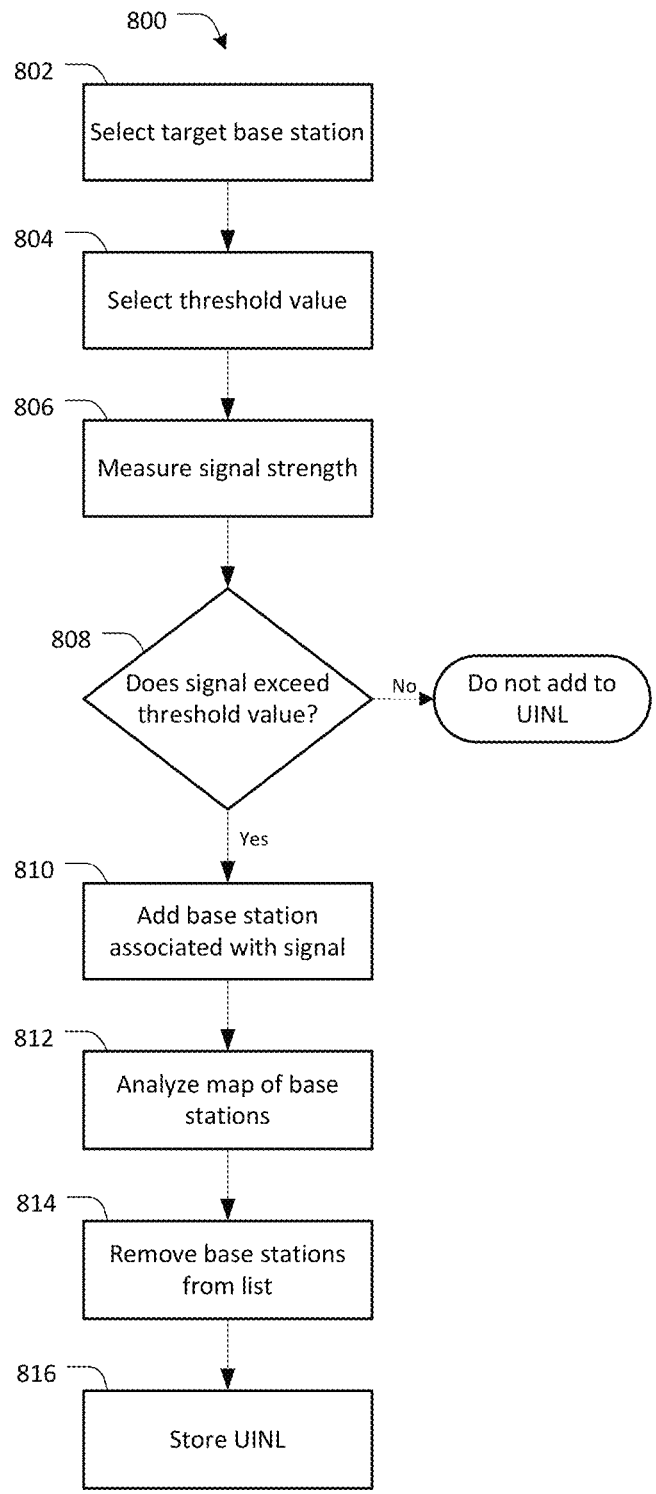
FIG. 8 illustrates a method for creating an uplink interference neighbor list according to an embodiment.

FIG. 8 illustrates a process 800 for creating an uplink interfering neighbor list (UINL) for a target base station. In an embodiment, the UINL includes base stations which serve UE whose uplink transmissions are received at greater than a predetermined threshold value by the target base station. Accordingly, a first step 802 of process 800 is selecting a target base station, and a step 804 is selecting a threshold value. In an embodiment, the threshold value is the noise power level at the target base station receiver.

In step 806, signal strength is measured. In an embodiment, base stations (from a set of candidate base stations) which serve UEs whose uplink transmissions are received at greater than a predetermined threshold value by the target base station can be determined by measuring the downlink signals from the target base station received at UEs served by the candidate base stations. For example, in an LTE embodiment, Reference Signal Received Power (RSRP) may be used, while in an UMTS embodiment, Received Signal Code Power (RSCP) may be used. The signals are transmitted by the target base station and received by one or more UE attached to the candidate base stations. When pilot signals are measured at UEs served by the candidate base stations, in step 808 they are compared to the predetermined threshold value. If the signal exceeds the threshold value, then in step 810 the candidate base station that serves the UE is added to the UINL of the target base station. In an embodiment, the threshold value against which the pilot signal measurements are compared is based on the pilot transmit power of the target base station. A higher threshold may be used for pilot signals transmitted at higher transmit power. In an embodiment, information about the target base station's signal strength at a candidate base station's UEs is retrieved by the NRC from the candidate base station. In another embodiment, the information may be exchanged between the candidate base station and the target base station using a direct interface between base stations such as the X2 interface in LTE.

In another embodiment, the target base station may measure signals received from UEs served by candidate base stations in step 806. In an LTE embodiment, the Demodulation Reference Signals (DM-RS) may be used. The measured signals are compared to a predetermined threshold value in step 808. If the signal from a UE exceeds the threshold value, then in step 810 the candidate base station serving the UE may be added to the UINL of the target base station.

Step 812 is analyzing a map of base stations, and it may be performed in addition or as an alternative to steps 806 to 810. In an embodiment, an RF signal prediction map may be used to identify base stations serving UE that transmit signals that are predicted to be received by the target base station above a predetermined level, and those base stations are added to the UINL. In another embodiment, step 812 includes identifying base stations within a predetermined area around the target base station.

In some embodiments, the UINL is a dynamic entity from which base stations are periodically removed. A UINL may be more relevant if it reflects current network conditions. Accordingly, step 814 is removing a base station from the UINL. In an embodiment, a timer which may be set to a predetermined time is started when a base station is added to the UINL. When signals associated with the base station exceed the threshold value in step 808, the timer is reset and the base station remains on the UINL. If the timer expires without being reset, the associated base station is removed from the UINL. In step 816, the UINL is stored in a memory. The UINL may be stored at the target base station or in a centralized location such as an NRC.

Figure 9:
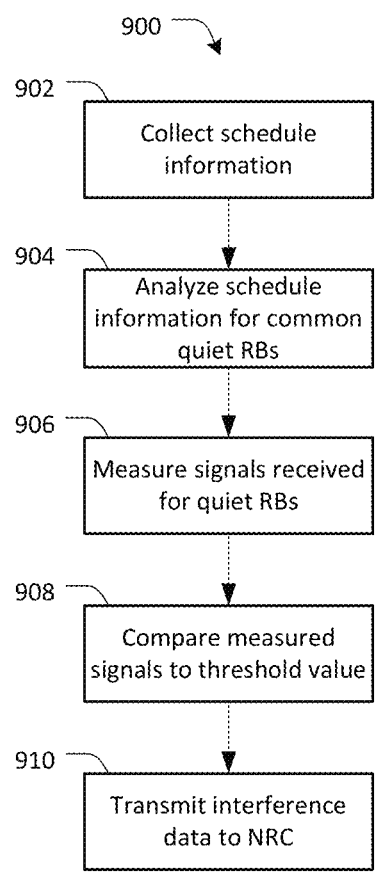
FIG. 9 illustrates a process for detecting interference according to an embodiment.

FIG. 9 illustrates a process 900 for detecting interference. In process 900, the uplink transmission schedules are set in a conventional fashion, and quiet times are identified in the existing schedules.

In step 902, schedule information is collected at a central location. For each target base station, schedule information is collected for each base station included in the UINL associated with the target base station. The information may be collected at a central location such as an NRC. The information may be transmitted in the form of transmission matrices as explained with respect to FIGS. 6A, 6B, 7A, and 7B. In another embodiment, the schedules are set in an arbitrary format, and are converted into matrices by the NRC or base stations. The conversion may include arranging RBs into rows and columns, and setting the number of columns.

After schedules are collected, in step 904 the schedules are analyzed to identify shared quiet times. In an embodiment, the schedules for every base station on the UINL associated with a target base station are transmitted to a central location such as an NRC. Uplink transmission matrices are collated to identify RBs for which no uplink transmissions are scheduled for any base station on the UINL, including the target base station. The shared quiet RBs may be referred to as common quiet RBs.

In step 906, the target base station measures signals for the quiet RBs. In other words, the target base station measures signals received at frequencies and times associated with common quiet RBs for the base stations in the UINL. Measuring signals may include analyzing data collected by the target base stations during the common quiet RBs and stored in a memory, and likewise schedule information may be stored in a memory. Therefore it is possible to perform aspects of process 900 periodically using stored data.

In an interference-free environment, the expected signal level detected by the target base station across common quiet RBs is equal to noise power. However, if interference is present at a particular time and frequency associated with the measured RB, the signal detected by the target base station will exceed the noise power.

Accordingly, in step 910, the received signal is compared to a threshold value. The threshold value may be the noise power, or some other value above the noise power. Turning to the example of FIG. 6B, assuming that a noise power is about −125 dBm, the signals that exceed the noise power (−90, −95) indicate the presence of interference.

Indices of RBs in which interference is detected may be transmitted from the target base station to an NRC in step 912. In an embodiment, quantified signal data is transmitted along with the indices. Subsequent analysis, including comparing the measured signal to a threshold value of step 910, may be conducted by the NRC using the quantitative data. In other embodiments, a quantized measure of the energy in the interfered RBs or quantized baseband samples from the time period of the interfered RBs may be sent back to an NRC.

The interference data collected from target base stations over multiple interference detection periods may be used to identify the presence external interference in the network. In an embodiment, if location information of base stations is available, the interference data may be used to localize the external interference. In addition, if signal strength measurements or baseband samples are sent by the base stations, the NRC can use trilateration or triangulation algorithms to locate the interference source.

In an embodiment, the NRC may build an interference fingerprint using base-band (if available), time, frequency, and base station information from the RB reports. The built fingerprint could be compared against a prebuilt network interference fingerprint database to characterize and/or identify the interference source. In an embodiment, interference data may be filtered to determine patterns with respect to parameters such as time, frequency, and geography, and that information may be used to identify the source of interference or to avoid the interference by scheduling around it. For example, if interference is determined to occur at certain frequencies with a regular periodicity, transmissions can be scheduled to avoid the times and frequencies in the geographies affected by the interference.

The activities of collecting interference data at an NRC and analyzing the signals correspond to steps 510 and 512 described above with respect to FIG. 5. Persons of skill in the art will recognize that these steps, and other aspects of process 500, may or may not be performed in various embodiments such as processes 900, 1000, and 1200.

A process 900 that employs identifying quiet RBs in an existing schedule is more effective during low-use situations than when base stations are heavily loaded. When fewer transmissions are present, more quiet times, or empty RBs, exist in a transmission schedule. When usage levels increase, it becomes increasingly difficult to identify empty RBs common to a target base station and the base stations on its UINL.

Therefore, in some embodiments, it may be desirable to apply a more deliberate detection scheme which focuses on particular times and/or frequencies to canvass a broader swath of resources than would otherwise be available in a random schedule. In other embodiments, a process 900 may reveal that interference is present in a general range of frequencies and times, and it is desirable to specify additional times and frequencies to more accurately characterize the interference. Accordingly, it is desirable to influence transmission schedules to increase the amount of empty RBs.

Figure 10:
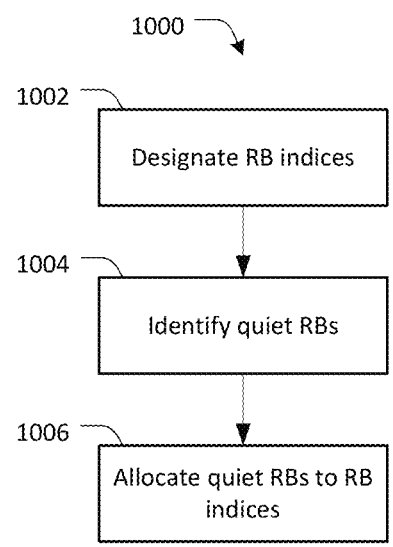
FIG. 10 illustrates a process for coordinating the transmissions of multiple base stations according to an embodiment.

One such embodiment is illustrated by FIG. 10. FIG. 10 illustrates a process 1000 for coordinating the uplink transmissions of multiple base stations. In an embodiment, process 1000 includes step 1002 of designating RB indices. A specific example of designating RB indices using two integer values will now be explained with respect to FIGS. 11A and 11B.

In an embodiment, the NRC specifies two integer parameters, $K_N(\in\{0, \ldots, N-1\})$ and $K_T(\in\{0, \ldots, N-1\})$, to the base station data schedulers. At time t ($t\in\{1, \ldots, T\}$) within the interference detection time period, each base station calculates a scanning index k using the two integer parameters according to the following Equation 1:

$$k(t)=(K_N+tK_T) \bmod N \qquad \text{[Equation 1]}$$

While scheduling uplink transmissions at time t, the data scheduler schedules uplink transmissions on candidate RBs with column indices further way from k(t) before scheduling on candidate RBs with indices near k(t). A candidate RB is an RB which is expected to achieve the desired data transmission rate at the given time. In an embodiment, data may be scheduled on the $k(t)^{th}$ RB only if no other candidate RBs are available. When the network is under-loaded, this scheduling methodology improves the likelihood of empty RBs in the vicinity of the $k(t)^{th}$ RB at time t.

Figure 11A:
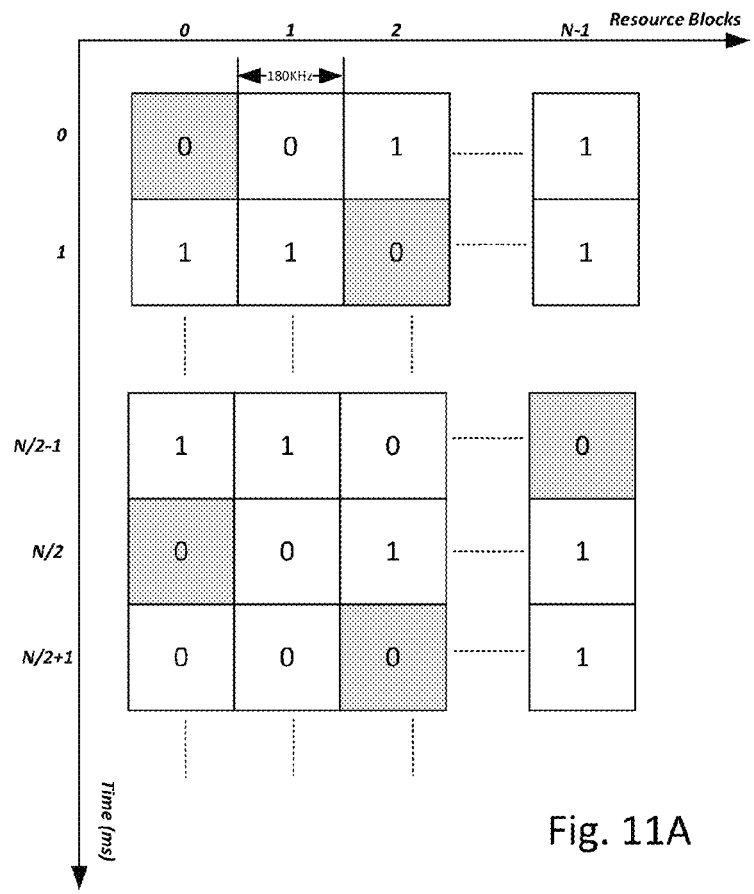
FIGS. 11A and 11B illustrates embodiments of scheduling quiet resource blocks.
Figure 11B:
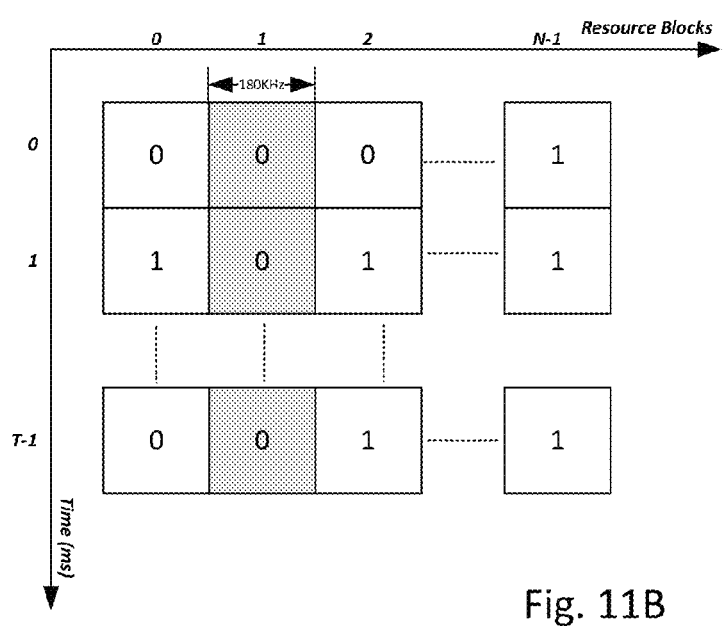

RBs with index k(t) ($t\in\{1, \ldots, T\}$) for two different sets of values for parameters $K_T$ and $K_N$ are shown in FIGS. 11A and 11B. In those figures, the indexed RB elements are shaded. It can be seen that integer $K_T$ effectively determines the rate at which frequency bands are revisited to test for interference. Integer $K_N$ provides an offset that determines which frequency bands are visited to test for interference. These parameters allow an embodiment to trade between the resolution of the frequency/time space scanned for interference and the speed with which it is scanned. Hence, in addition to providing a mechanism to increase the availability of empty RBs for interference scanning, the two parameters provide flexibility in configuring the interference detection and localization scheme for different operational requirements.

In an embodiment, interference detection parameters including the integer parameters $K_N$ and $K_T$ described above may be changed depending on conditions. For example, during initialization, a system may initially scan all frequencies for the presence of interference. In an embodiment using Equation 1, this is achieved by setting $K_N$ to zero and $K_T$ to 1. In this example, interference is detected in an RB with column index p. After interference is detected, the system may reconfigure the detection process to determine characteristics of the interference, such as the periodicity of the interference.

For example, $K_N$ may be set to p and $K_T$ to 0. With these integer values, the $p^{th}$ RB is scanned frequently leading to high resolution in determining the periodicity of the interference. In another embodiment, a process may search the frequency bands for an interferer with a known periodicity of p ms. This may be achieved by setting the parameter $K_T$ such that a frequency bin is revisited every p/2 ms and incrementing the offset $K_N$ every consecutive interference detection time period to scan all the frequency bins.

In step 1004, the number of RBs in an uplink transmission is identified in schedule information. The schedule information referred to in step 1004 may be uplink transmission schedule information that has been generated without actively coordinating quiet times between a plurality of base stations. In an embodiment, the schedule information may simply be a list of RBs that are to be allocated or unallocated and that are not organized in any sequence. In other words, in an embodiment, schedule information may simply include information on how many RBs are determined to be active or empty during a given time period.

The schedule information may be generated by different physical entities. In an embodiment in which data schedulers are located in each base station, each base station may generate an individual transmission schedule and transmit that schedule to an NRC, where the collected schedules are the schedule information. In another embodiment, scheduling is conducted centrally by an NRC, and the schedule information may include the schedules of all base stations on an UINL.

In step 1006, the unallocated RBs are allocated to the designated RB indices. As noted above, in an embodiment in which the number of unallocated RBs in the schedule information exceeds the number of designated RB indices, the surplus empty RBs may be allocated to RBs adjacent in time and/or frequency to the designated RB indices.

The process 1000 for coordinated scheduling relies on the availability of unallocated quiet RBs in each base station during normal operation. In base stations with heavy uplink traffic, this may not always be the case. Therefore, in an embodiment, RBs may be prioritized for interference scanning. In such an embodiment, a number and location of quiet RBs may be mandated in an uplink transmission schedule.

FIG. 12 shows an embodiment of a process for detecting interference in a cellular network that accounts for loading in the network. In step 1202, two integer parameters $K_A\in\{1, 2, \ldots\}$ and $K_S\in\{0, 1, \ldots\}$ are set. In step 1204, for each t ms ($t\in\{1, \ldots, T\}$), an average number of empty RBs is identified over the previous $K_A$ interference detection periods. In the following description, this average is denoted by e(t).

In step 1206, for each t ms ($t\in\{1, \ldots, T\}$) of the next interference detection period, If $K_S=0$, the embodiment simply uses a schedule without any prioritization, such as process 900. In other words, in process 1200, when $K_S$ is zero, interference is detected by measuring signals during quiet RBs common to the base stations on the UINL according to process 900 or 1000.

In step 1208, if $K_S \neq 0$ and $e(t) \geq K_S$, process 1200 uses the scheduling procedure used in the previous interference detection period. However, if $K_S \neq 0$ and $e(t) < K_S$, the process 1200 calculates k(t) as described above with respect to Equation 1. In step 1210, a set of indices are calculated according to the following Equation 2:

$$s(t) = \{(k(t)-m) \bmod N, (k(t)-m+1) \bmod N, \ldots, k(t), \ldots, (k(t)+m-1) \bmod N\} \quad \text{[Equation 2]}$$

In Equation 2, the parameter m controls the number of RBs left empty in the vicinity of k(t) and is given by the following Equation 3:

$$m = \text{ceil}(K_S/2) \quad \text{[Equation 3]}$$

Process 1200 does not schedule any data transmissions on RBs indexed by the set s(t). Accordingly, in step 1212, quiet RBs are scheduled for the indices of s(t). In addition, a buffer corresponding to the parameter m may be set around the quiet RBs, which may enhance the accuracy of interference measurements and increase the amount of interference information gathered. In an embodiment, if the base station is under-loaded, it schedules data transmissions at RBs with indices as far away from s(t) as possible.

It should be noted that aspects of process 1200 can be carried out in different ways in different embodiments. For example, when data schedulers are located at individual base stations, parameter m may be set for each base station according to its current level of loading. In other embodiments, data scheduling may be conducted centrally, so schedules may be set by an NRC.

The number of empty RBs available for interference scanning at a target base station depends on the number as well as the relative position of unallocated RBs across base stations in its UINL. In the case of symmetric UINLs (i.e. if base station-1 being in the UINL of base station-2 implies that base station-2 is in the UINL of base station-1), process 1200 forces all base stations in the UINL of a base station with an insufficient number of empty RBs (referred to here as the candidate base station) to coordinate the number and position of their unallocated RBs. However, if the UINLs are asymmetric, there is a possibility that not all base stations in the UINL of the target base station coordinate their allocation.

For instance, consider a base station A in the UINL of a target base station B. Assume that the UINL of base station A does not include base station B and base station A has zero unallocated RBs in the $K_A$−1 previous interference detection periods. Base station B can still have an average of $K_S$ empty RBs in $K_A$ interference detection periods, if it and all the base stations in its UINL, have $K_S \times K_A$ unallocated RBs in the next interference detection period. In this case, base station B will not coordinate its unallocated RBs with the target base station A. For such situations, process 1200 provides a way to tune the scheduling procedure so that the positions of unallocated RBs match in each interference detection period.

In an embodiment, the parameter $K_S$ determines the priority for interference scanning over data transmission. A larger value for $K_S$ implies a larger priority for interference scanning. A value of zero implies that interference scanning is not prioritized.

Process 1200 provides a way to dynamically configure the priority of interference detection relative to data transmission. Such an embodiment is especially useful in scenarios where the cellular network is not the primary user of the spectrum and shares the spectrum with agencies that provide mission-critical communications. For example, during emergencies, interference detection (and subsequent avoidance) could be configured to have a greater priority than data transmission. In addition, process 1200 is not exclusive of the other processes described herein, and persons of skill in the art will recognize that various aspects of the processes may be combined in various embodiments.

FIG. 1300 shows a process for interference detection using downlink frequencies. In frequency division duplexing (FDD) systems where base stations can tune their receivers to the downlink frequencies, process 1300 may be employed to scan for external interference in the downlink frequencies. In step 1302, a frequency, or range of frequencies, is selected. In step 1304, downlink transmissions are stopped in base stations for an interference detection period. In an embodiment, the base stations are on the UINL of a target base station and include the target base station. In step 1306, receivers of the target base station are tuned to the selected frequency, and scan the frequency during the interference detection period.

Other embodiments may be adapted or optimized for other transmission schemes. For example, in time division duplexing (TDD) systems, a portion of time designated for downlink transmissions can be reallocated to uplink transmissions. Reallocation increases the number of RBs available for uplink data transmission and consequently increases the probability of finding empty RBs for interference scanning. In another embodiment, reallocation may be employed be used to more accurately characterize the periodicity of interference. Note that in order to avoid significant increase in intra-system interference, the reallocation would be done across all the base-stations in the network.

Embodiments described herein provide for processes, an apparatus, and a system for detecting interference in a cellular network. Advantages that may be realized by various embodiments include reduced cost and time by operating on existing equipment, embodiments that can detect interference without affecting existing traffic, and embodiments that can account for various levels of traffic. In some embodiments, parameters can be specified in order to adjust the location and priority of measurement intervals. The parameters can be adjusted to adapt various embodiments to a wide variety of network conditions.

Numerous examples of specific details, including specific equations, are provided to help illustrate various aspects of the present invention. However, the particular details should not be considered to limit the scope of the claims. It should be recognized that other embodiments are possible within the scope of the present invention.

Although aspects of certain processes are described as taking place using specific equipment in certain specific situations, persons of skill in the art will recognize that in other embodiments other processes may be performed using other equipment without departing from the scope and spirit of the present invention. For example, certain scheduling activities may be performed by a base station in one embodiment and an NRC in another embodiment. Accordingly, the term "one or more computer readable media" encompasses embodiments in which processes may be performed by a single processing core at a single physical location, as well as embodiments in which the processes are performed by a plurality of processing cores at a plurality of physical locations based on instructions encoded on a corresponding plurality of computer readable media.

What is claimed is:

1. A method for identifying interference in a cellular network, the method comprising:
   creating an interference neighbor list for a target base station that includes a plurality of neighboring base stations;
   determining a plurality of quiet resource blocks common to all of the plurality of neighboring base stations on the interference neighbor list and the target base station; and
   analyzing data corresponding to interference received at the target base station during the plurality of quiet resource blocks,
   wherein determining the plurality of quiet resource blocks comprises:
      designating a plurality of resource block indices in uplink transmission schedules of the plurality of neighboring base stations and the target base station; and
      allocating one or more quiet resource blocks to the plurality of resource block indices.

2. The method of claim 1, further comprising:
   transmitting schedule information from each base station on the interference neighbor list to a computing device coupled to a backhaul portion of the cellular network,
   wherein the computing device determines the plurality of quiet resource blocks common to the plurality of neighboring base stations and the target base station.

3. The method of claim 1, wherein determining the plurality of quiet resource blocks further comprises:
   comparing schedule information of each base station on the interference neighbor list to schedule information for the target base station to identify additional quiet resource blocks common to the plurality of neighboring base stations and the target base station.

4. The method of claim 1, wherein the plurality of resource block indices are designated according to the following equation:

$$k(t)=(K_N+tK_T) \bmod N,$$

in which N is a total number of resource blocks in an interference detection period, k(t) is an index, $K_N$ and $K_T$ are integers in the set $\{0, \ldots, N-1\}$, and t is an integer in the set $\{0, \ldots, T\}$.

5. The method of claim 1, wherein the plurality of resource block indices are defined by an offset and a rate within a plurality of interference detection periods.

6. The method of claim 1, wherein determining the plurality of quiet resource blocks further comprises:
   calculating an average number of quiet resource blocks present in a schedule of at least one base station among the plurality of neighboring base stations;
   comparing the average number of quiet resource blocks to a value; and
   when the average number of quiet resource blocks is less than the value, allocating additional quiet resource blocks to an uplink transmission schedule.

7. The method of claim 6, wherein the additional quiet resource blocks are allocated adjacent to indexed quiet resource blocks in the uplink transmission schedule.

8. The method of claim 1, wherein analyzing the data corresponding to interference received at the target base station includes determining at least one of a location and a periodicity of the interference received by the target base station.

9. The method of claim 1, wherein creating the interference neighbor list comprises:
   receiving wireless signals from a plurality of user equipment attached to neighboring base stations at the target base station;
   comparing a value of each of the received wireless signals to a threshold value; and
   when a value of a particular signal exceeds the threshold value, adding a base station serving a user equipment which sent the particular signal to the interference neighbor list.

10. The method of claim 1, wherein creating the interference neighbor list comprises:
    receiving a wireless signal from the target base station at a user equipment served by a candidate base station;
    comparing a value of the received wireless signal to a threshold value; and
    when the value of the received wireless signal exceeds the threshold value, adding the candidate base station serving the user equipment to the interference neighbor list of the target base station.

11. The method of claim 1, further comprising:
    removing a first base station from the interference neighbor list when a signal associated with the first base station is not received with a power level exceeding a threshold value within a predetermined time.

12. The method of claim 1, further comprising:
    designating a set of downlink frequencies;
    tuning a receiver of the target base station to the set of downlink frequencies; and
    receiving signals over the set of downlink frequencies by the receiver of the target base station,
    wherein analyzing the received signals includes analyzing the signals received over the set of downlink frequencies.

13. The method of claim 1, further comprising:
    in a time division duplexing (TDD) transmission scheme, reallocating a portion of time designated for downlink transmissions to a portion of time designated for uplink transmissions.

14. A system for identifying interference in a cellular network, the system comprising:
    a plurality of base stations; and
    a memory;
    a processor; and
    one or more non-transitory computer readable medium associated with the processor, the one or more non-transitory computer readable medium having computer executable instructions stored thereon which, when executed by an associated one or more processor, perform the following steps:
    creating an interference neighbor list for a target base station that includes a plurality of neighboring base stations;
    determining a plurality of quiet resource blocks common to all of the plurality of neighboring base stations on the interference neighbor list and the target base station; and
    analyzing data corresponding to interference received by the target base station during the plurality of quiet resource blocks,
    wherein determining the plurality of quiet resource blocks comprises:
       designating a plurality of resource block indices in uplink transmission schedules of the plurality of neighboring base stations and the target base station; and
       allocating one or more quiet resource blocks to the plurality of resource block indices.

15. The system of claim 14, wherein determining the plurality of quiet resource blocks further comprises:
comparing schedule information of the plurality of neighboring base stations on the interference neighbor list to schedule information of the target base station to identify additional quiet resource blocks common to the plurality of neighboring base stations and the target base station.

16. The system of claim 14, wherein the plurality of resource block indices are designated according to the following equation:

$$k(t)=(K_N+tK_T)\bmod N,$$

in which N is a total number of resource blocks in an interference detection period, k(t) is an index, $K_N$ and $K_T$ are integers in the set $\{0, \ldots, N-1\}$, and t is an integer in the set $\{0, \ldots, T\}$.

17. The system of claim 14, wherein the plurality of resource block indices are defined by an offset and a rate within a plurality of interference detection periods.

18. The system of claim 14, wherein determining the plurality of quiet resource blocks further comprises:
calculating an average number of quiet resource blocks present in a schedule of at least one base station among the plurality of base stations;
comparing the average number of quiet resource blocks to a value; and
when the average number of quiet resource blocks is less than the value, allocating additional quiet resource blocks to an uplink transmission schedule.

19. The system of claim 18, wherein the additional quiet resource blocks are allocated adjacent to indexed quiet resource blocks in the uplink transmission schedule.

20. The system of claim 14, wherein analyzing the data corresponding to interference received by the target base station includes determining at least one of a location and a periodicity of the interference received by the target base station.

21. The system of claim 14, wherein creating the interference neighbor list comprises:
receiving wireless signals from a plurality of a user equipment attached to neighboring base stations at the target base station;
comparing a value of each of the received wireless signals to a threshold value; and
when a value of a particular signal exceeds the threshold value, adding a base station serving user equipment which sent the particular signal to the interference neighbor list.

22. The system of claim 14, wherein, in a frequency division duplexing (FDD) scheme, a portion of downlink frequencies are reallocated to uplink frequencies when performing interference detection.

23. The system of claim 14, wherein, in a time division duplexing (TDD) transmission scheme, a portion of time designated for downlink transmissions is reallocated to a portion of time designated for uplink transmissions.

24. The system of claim 14, wherein the one or more non-transitory computer readable medium includes a first computer readable medium disposed at the target base station and a second computer readable medium disposed at a base station from among the neighboring base stations, and
wherein the processor includes a first processing core disposed at the target base station and a second processing core disposed at a base station from among the neighboring base stations.

25. A method for identifying interference in a cellular network, the method comprising:
creating an interference neighbor list for a target base station that includes a plurality of neighboring base stations;
determining a plurality of quiet resource blocks common to all of the plurality of neighboring base stations on the interference neighbor list and the target base station; and
analyzing data corresponding to interference received at the target base station during the plurality of quiet resource blocks,
wherein determining the plurality of quiet resource blocks comprises:
calculating an average number of quiet resource blocks present in a schedule of at least one base station among the plurality of neighboring base stations;
comparing the average number of quiet resource blocks to a value; and
when the average number of quiet resource blocks is less than the value, allocating additional quiet resource blocks to an uplink transmission schedule.

26. A system for identifying interference in a cellular network, the system comprising:
a plurality of base stations; and
a memory;
a processor; and
one or more non-transitory computer readable medium associated with the processor, the one or more non-transitory computer readable medium having computer executable instructions stored thereon which, when executed by an associated one or more processor, perform the following steps:
creating an interference neighbor list for a target base station that includes a plurality of neighboring base stations;
determining a plurality of quiet resource blocks common to all of the plurality of neighboring base stations on the interference neighbor list and the target base station; and
analyzing data corresponding to interference received by the target base station during the plurality of quiet resource blocks,
wherein determining the plurality of quiet resource blocks comprises:
calculating an average number of quiet resource blocks present in a schedule of at least one base station among the plurality of neighboring base stations;
comparing the average number of quiet resource blocks to a value; and
when the average number of quiet resource blocks is less than the value, allocating additional quiet resource blocks to an uplink transmission schedule.

* * * * *